(12) United States Patent
Yu et al.

(10) Patent No.: US 7,608,352 B2
(45) Date of Patent: Oct. 27, 2009

(54) METHOD FOR SHUTTING DOWN A FUEL CELL SYSTEM USING AN AIR PURGE

(75) Inventors: Paul T. Yu, Pittsford, NY (US); Frederick T. Wagner, Fairport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 169 days.

(21) Appl. No.: 11/836,557

(22) Filed: Aug. 9, 2007

(65) Prior Publication Data
US 2008/0003465 A1 Jan. 3, 2008

Related U.S. Application Data

(62) Division of application No. 10/920,838, filed on Aug. 18, 2004, now Pat. No. 7,270,904.

(51) Int. Cl.
*H01M 8/04* (2006.01)

(52) U.S. Cl. .............................. 429/13; 429/24; 429/26

(58) Field of Classification Search .................. None
See application file for complete search history.

(56) References Cited

U.S. PATENT DOCUMENTS

| | | | | |
|---|---|---|---|---|
| 6,093,500 | A | * | 7/2000 | Margiott et al. ............... 429/13 |
| 6,124,054 | A | * | 9/2000 | Gorman et al. ............... 429/34 |
| 2002/0076583 | A1 | * | 6/2002 | Reiser et al. ................. 429/13 |

\* cited by examiner

*Primary Examiner*—John S Maples
(74) *Attorney, Agent, or Firm*—John A. Miller; Miller IP Group, PLC

(57) ABSTRACT

A method for delaying an air purge of a fuel cell stack at system shut-down until the temperature of the stack is reduced below a predetermined temperature. The fuel cell stack includes an anode side, a cathode side, an anode input, a cathode input and an anode exhaust. A temperature sensor monitors the temperature of a cooling fluid flowing through the stack. The anode side of the fuel cell stack is purged at the stack shut-down by directing air from the cathode input line to the anode input line after the temperature of the cooling fluid is reduced to the predetermined temperature.

20 Claims, 1 Drawing Sheet

METHOD FOR SHUTTING DOWN A FUEL CELL SYSTEM USING AN AIR PURGE

CROSS-REFERENCE TO RELATED APPLICATION

This application is a Divisional application of U.S. patent application Ser. No. 10/920,838, filed Aug. 18, 2004, U.S. Pat. No. 7,270,904, and titled "Procedures For Shutting Down Fuel Cell System By Using Air Purge At Low Cell Temperature."

BACKGROUND OF THE INVENTION

1. Field of the Invention

This invention relates generally to a method for purging a fuel cell stack at system shut-down and, more particularly, to a method for purging the anode side of a fuel cell stack at stack shut-down using cathode air that includes delaying the air purge until the temperature of the fuel cell stack has dropped below a predetermined temperature so as to reduce cell deterioration.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is in the anode, typically by a catalyst, to generate free hydrogen protons and electrons. The hydrogen protons pass through the electrolyte to the cathode. The hydrogen protons react with the oxygen and the electrons, typically by a catalyst, in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorinated acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. For example, a typical fuel cell stack for a vehicle may have two hundred stacked fuel cells. The fuel cell stack receives a cathode input gas as a flow of air, typically forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

When a fuel cell system is shut down, unused hydrogen gas remains in the anode side of the fuel cell stack. This hydrogen is able to diffuse through or cross over the membrane and react with the oxygen within the catalyst layer on the cathode side. As the hydrogen diffuses out of the anode side to the cathode side, the total pressure within the anode side is reduced below the ambient pressure. This pressure differential sucks air from the ambient into the anode side of the stack. When the air enters the anode side of the stack it generates an air/hydrogen front that creates a short circuit in the anode side, resulting in a lateral flow of hydrogen ions from the hydrogen flooded portion of the anode side to the air-flooded portion of the anode side. This high ion current through the high lateral ionic resistance of the membrane produces a significant (~0.5 V) lateral potential drop in the membrane. This produces a local high potential between the cathode opposite the air-filled portion of the anode and adjacent to the electrolyte that drives rapid carbon corrosion, and causes the carbon layer to get thinner. This decreases the support for the catalyst particles, which decreases the performance of the fuel cell.

It is known in the art to purge the hydrogen out of the anode side of the fuel cell stack at system shut-down by forcing air into the anode side at high pressure from the cathode input. The air purge creates the air/hydrogen front that causes the cathode carbon corrosion, as discussed above. Thus, it is desirable to reduce the air/hydrogen front residence time to as short as possible, where the front residence time is defined as the anode flow channel volume divided by the air purge flow rate. Higher purge rates will decrease the front residence time for a fixed anode flow channel volume.

It has been observed that because the known anode purge occurs immediately at system shut-down when the fuel cell stack is still near its operating temperature, the air/hydrogen front still creates significant corrosion in the cathode catalyst. In other words, it has been discovered that temperature is an important factor in catalyst corrosion in that a lower stack temperature provides a lower stack degradation rate.

SUMMARY OF THE INVENTION

In accordance with the teachings of the present invention, a method is disclosed for delaying an air purge of a fuel cell stack at system shut-down until the temperature of the stack has dropped below a predetermined temperature so as to reduce fuel cell deterioration. The fuel cell stack includes an anode side, a cathode side, an anode input, a cathode input and an anode exhaust. A temperature sensor monitors the temperature of a cooling fluid flowing through the stack. The anode side of the fuel cell stack is purged at the stack shut-down by directing air from the cathode input line to the anode input line after the temperature of the cooling fluid has dropped to a low enough temperature.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for delaying an air purge of a fuel cell stack at system shut-down is merely exemplary in nature, and is in no way intended to limit the invention or its applications or uses.

According to the invention, a procedure for purging the anode side of a fuel cell stack with air at fuel cell system shut-down is disclosed. The procedure includes waiting until the fuel cell stack temperature is below a certain temperature at system shut-down before the anode side is purged with air to reduce cathode catalyst corrosion. By purging the anode side of the stack with air at high pressure after the fuel cell stack has been reduced to a relatively cool temperature, both a low air/hydrogen front residence time and low stack degradation rate can be achieved so that the corrosion of the cathode catalyst is reduced.

Figure 1:
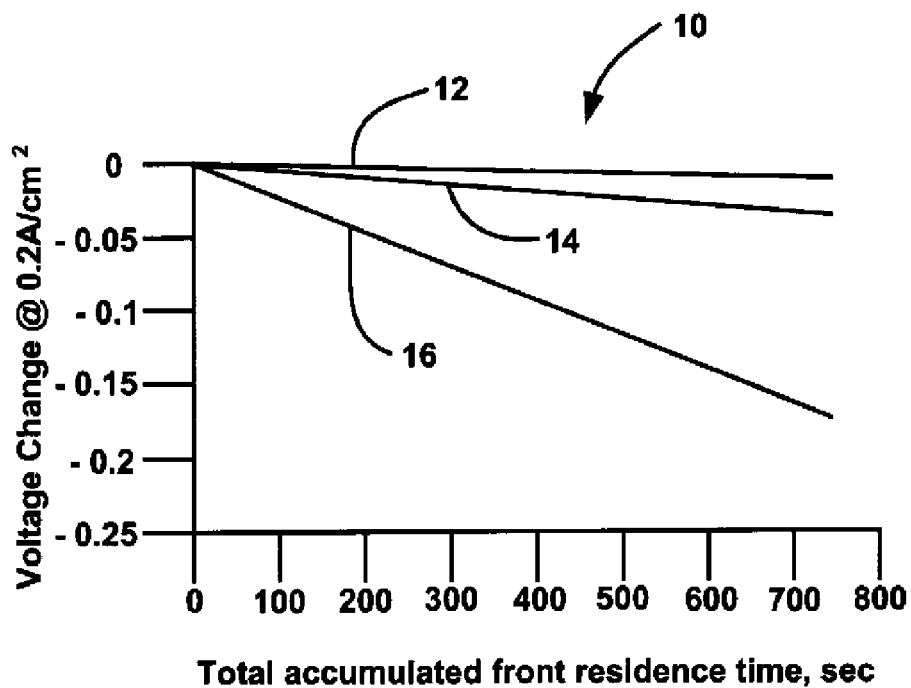
FIG. 1 is a graph with time on the horizontal axis and voltage on the vertical axis showing the effect of the air/hydrogen front temperature on the degradation of a fuel cell.

FIG. 1 is a graph with total accumulation time on the horizontal axis and cell voltage at 0.2 A/cm$^2$ on the vertical axis showing the effect of the air/hydrogen front temperature on the degradation of a 50 cm$^2$ fuel cell. Cell test conditions include an RH=100/100% and cell stoichiometry=2/2. Graph line 12 shows the degradation of the fuel cell for a cell temperature of 30° C., graph line 14 shows the degradation of the fuel cell for a cell temperature of 50° C., and graph line 16 shows the degradation of the fuel cell for a cell temperature of 80° C. As is apparent, degradation of the fuel cell is very high at its operating temperature of 80° C. However, when the temperature goes below 50° C., the fuel cell degradation is significantly reduced. Table 1 below gives values for the graph in FIG. 1.

check valve 44 in the anode exhaust line 42 prevents the hydrogen from the hydrogen source 34 from traveling through the anode exhaust line 42. A control valve 48 in the anode exhaust gas line 42 allows the anode exhaust to be selectively output to the environment during anode purging.

A cooling fluid is pumped through the fuel cell stack 22 and a coolant line 60 by a pump 62. A heat exchanger 64, such as a vehicle radiator, cools the heated cooling fluid from the stack 22. The temperature of the cooling fluid is measured by a temperature sensor 58. The rate of pumping by the pump 62 can be selectively increased or decreased to provide a desired fuel cell stack operating temperature, such as 80° C.

During operation of the fuel cell stack 22, a switch 54 is closed to provide output power from the fuel cell stack 22 to a primary load 50, such as a vehicle drive train, on an external circuit 66. A switch 56 is open to prevent output power from the fuel cell stack 22 from being delivered to an auxiliary load 52. The purge valve 28 is closed to prevent cathode input air from entering the anode input line 36. The valve 46 is open and the valve 48 is closed so that the anode exhaust is sent to the anode input line 36.

When the fuel cell stack 22 is shut down, the valve 38 is closed to prevent hydrogen from the source 34 from being input to the fuel cell stack 22. Additionally, the switch 54 is opened and the switch 56 is closed to disconnect the primary load 50 from the stack 22 and connect the auxiliary load 52 to the stack 22 so that the remaining hydrogen in the fuel cell stack 22 is consumed. The auxiliary load 52 provides power to the pump 62 to drive the pump 62 at system shut-down to cool the stack 22. When the fuel cell stack 22 is shut down, the speed of the pump 62 is increased, preferably to a maximum speed, so that the stack temperature is reduced by the cooling fluid as quickly as possible.

According to the invention, when the stack temperature is reduced below a certain temperature, such as 50° C. or less, the switch 56 is opened to disconnect the auxiliary load 52.

TABLE 1

| Cycle # | Total accumulated front residence time, sec | 30° C. @0.2 A/cm$^2$, Voltage change, V | 50° C. @0.2 A/cm$^2$, Voltage change, V | 80° C. @0.2 A/cm$^2$, Voltage change, V | 30° C. @0.8 A/cm$^2$, Voltage change, V | 50° C. @0.8 A/cm$^2$, Voltage change, V | 80° C. @0.8 A/cm$^2$, Voltage change, V |
|---|---|---|---|---|---|---|---|
| 0 | 0 | 0 | 0 | 0 | 0 | 0 | 0 |
| 20 | 362.4 | −0.0002 | −0.0199 | −0.0513 | −0.0047 | −0.0450 | −0.2266 |
| 40 | 724.8 | −0.0142 | −0.0327 | −0.1937 | −0.0322 | −01486 | −0.4092 |

Figure 2:
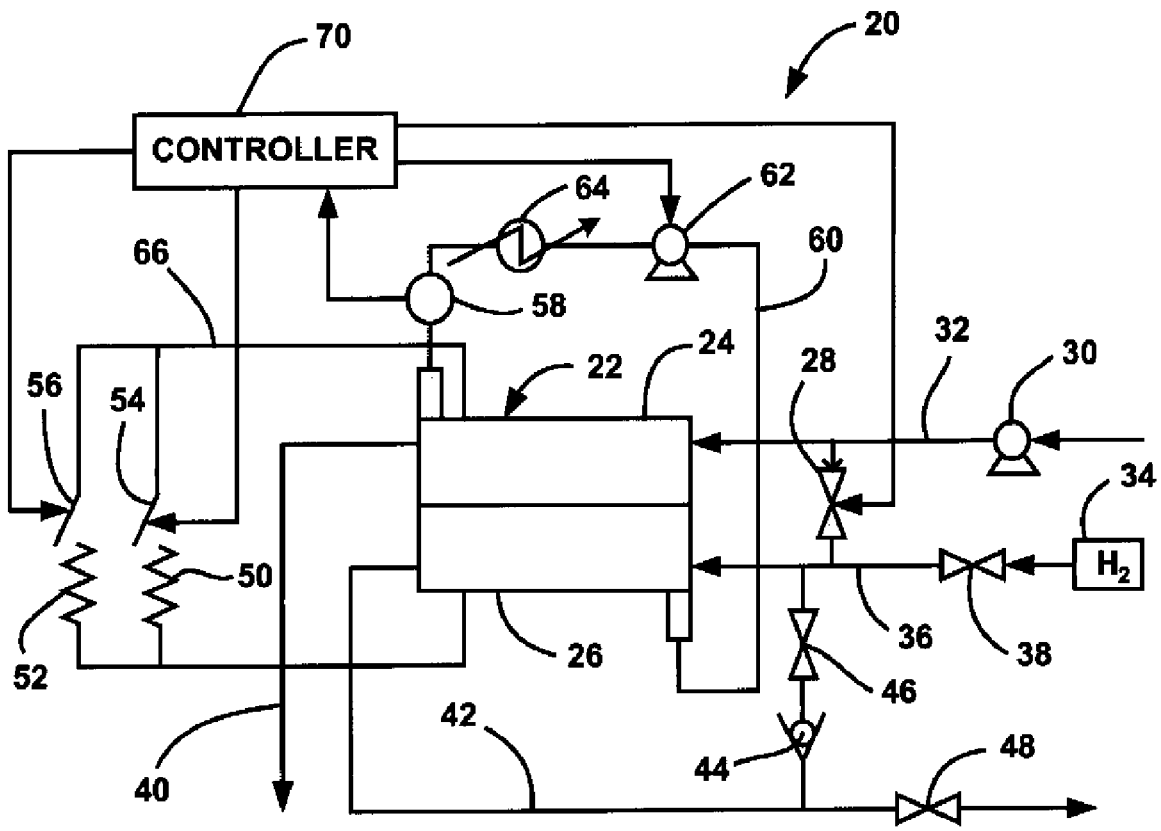
FIG. 2 is a schematic plan view of a fuel cell system employing a procedure for an air purge delay at system shut-down, according to an embodiment of the present invention.

FIG. 2 is a schematic plan view of a fuel cell system 20 including a fuel cell stack 22 having a cathode side 24 and an anode side 26. A compressor 30 provides compressed air on a cathode input line 32 to the cathode side 24 of the fuel cell stack 22. Hydrogen is provided from a hydrogen source 34 on an anode input line 36 to the anode side 26 of the fuel cell stack 22 through a control valve 38. A purge valve 28 is provided between the cathode input line 32 and the anode input line 36 to allow the compressed air to be sent to the anode input line 36 during anode purge at system shut-down, as will be discussed below.

A cathode exhaust is output from the fuel cell stack 22 on a cathode exhaust line 40, and an anode exhaust is output from the fuel cell stack 22 on an anode exhaust line 42. A control valve 46 in the anode exhaust line 42 allows the anode exhaust to be selectively sent back to the anode input line 36 so that unused hydrogen in the anode exhaust can be recycled. A Also, the valve 46 is closed and the valves 48 and 28 are opened. Therefore, compressed air from the compressor 30 is forced into the anode input line 46 to purge the anode side 26 of the stack 22 to the environment. If the pressure of the hydrogen within the anode side 26 gets to be too low while the system 20 is waiting for the temperature of the stack 22 to be reduced, the valve 38 can be slightly opened to allow some of the hydrogen from the source 34 to enter the anode side 26 to prevent ambient air from being sucked into the anode side 26, and to provide electricity to the auxiliary load 52 for pumping the cooling fluid to the stack 22. A system controller 70 receives the temperature signal from the temperature sensor 58, and controls the operation of the valves, switches, pumps, etc. in a manner consistent with the discussion herein.

It is desirable to match the time it takes the stack temperature to be reduced to the desired temperature at shut-down to the time that it takes the remaining hydrogen in the fuel cell stack 22 to be consumed by the auxiliary load 52. This reduces the air/hydrogen front when the anode side 26 is purged. In one embodiment, the purge time is less than 0.1 second. When the air purge is complete, the valves 48 and 28 are closed and the valve 46 is reopened.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for purging a fuel cell stack at stack shut-down, said fuel cell stack including an anode side, a cathode side, an anode input line, a cathode input line and an anode exhaust line, said method comprising:
monitoring the temperature of a cooling fluid flowing through the fuel call stack;
maintaining the temperature of the cooling fluid at an operating temperature during operation of the fuel cell stack; and
purging the anode side of the fuel cell stack at the stack shut-down after the temperature of the cooling fluid is reduced to a predetermined temperature that is cooler than the operating temperature, wherein purging the anode side includes directing air from the cathode input line to the anode input line.

2. The method according to claim 1 wherein purging the anode side includes directing anode exhaust on the anode exhaust line to the environment.

3. The method according to claim 1 further comprising switching an output of the fuel cell stack from a primary load to an auxiliary load at the stack shut-down to eliminate remaining hydrogen in the fuel cell stack.

4. The method according to claim 3 further comprising operating a pump to pump the cooling fluid through the fuel cell stack with power from the auxiliary load at the stack shut-down.

5. The method according to claim 3 wherein the time it takes the auxiliary load to consume the remaining hydrogen is about the same as the time it takes the temperature of the cooling fluid to be reduced from the operating temperature to the predetermined temperature.

6. The method according to claim 1 further comprising disconnecting the fuel cell stack from an auxiliary load when the anode purge begins.

7. The method according to claim 1 wherein the predetermined temperature is about 50° C. or less.

8. A method for purging a fuel cell stack at stack shut-down, said method comprising:
monitoring the temperature of a cooling fluid flowing through the fuel cell stack;
maintaining the temperature of the cooling fluid at an operating temperature during operation of the fuel cell stack;
purging an anode side of the fuel cell stack at the stack shut-down using cathode input air after the temperature of the cooling fluid has dropped to a predetermined temperature that is less than the operating temperature; and
opening an anode exhaust valve at the stack shut-down to vent the purge air from the anode side of the stack.

9. The method according to claim 8 further comprising switching an output of the fuel cell stack from a primary load to an auxiliary load at the stack shut-down to eliminate remaining hydrogen in the fuel cell stack.

10. The method according to claim 9 further comprising operating a pump to pump the cooling fluid through the fuel cell stack with power from the auxiliary load at the stack shut-down.

11. The method according to claim 9 wherein the time it takes the auxiliary load to consume the remaining hydrogen is about the same as the time it takes the temperature of the cooling fluid to drop from the operating temperature to the predetermined temperature.

12. The method according to claim 8 further comprising disconnecting the fuel cell stack from an auxiliary load when the anode purge begins.

13. The method according to claim 8 wherein the predetermined temperature is about 50° C. or less.

14. A method for purging a fuel cell stack at stack shut-down, said method comprising:
monitoring the temperature of a cooling fluid flowing through the fuel cell stack;
maintaining the temperature of the cooling fluid at an operating temperature during operation of the fuel cell stack;
purging an anode side of the fuel cell stack at the stack shut-down using cathode input air after the temperature of the cooling fluid has dropped to a predetermined temperature that is less than the operating temperature; and
disconnecting the fuel cell stack from an auxiliary load when the anode side purge begins.

15. The method according to claim 14 further comprising switching an output of the fuel cell stack from a primary load to the auxiliary load at the stack shut-down to eliminate remaining hydrogen in the fuel cell stack.

16. The method according to claim 15 wherein the time it takes the auxiliary load to consume the remaining hydrogen is about the same as the time it takes the temperature of the cooling fluid to drop from the operating temperature to the predetermined temperature.

17. The method according to claim 14 further comprising operating a pump to pump the cooling fluid through the fuel cell stack with power from the auxiliary load at the stack shut-down.

18. The method according to claim 14 wherein the predetermined temperature is about 50° C. or less.

19. A method for purging a fuel cell stack at stack shut-down, said fuel cell stack including an anode side, a cathode side, an anode input line, a cathode input line and an anode exhaust line, said method comprising:
monitoring the temperature of a cooling fluid flowing through the fuel cell stack;
maintaining the temperature of the cooling fluid at an operating temperature during operation of the fuel cell stack;
purging the anode side of the fuel cell stack at the stack shut-down after the temperature of the cooling fluid is reduced to a predetermined temperature that is cooler than the operating temperature;
switching an output of the fuel cell stack from a primary load to an auxiliary load at the stack shut-down to eliminate remaining hydrogen in the fuel cell stack; and
operating a pump to pump the cooling fluid through the fuel cell stack with power from the auxiliary load at the stack shut-down.

20. A method for purging a fuel cell stack at stack shut-down, said fuel cell stack including an anode side, a cathode side, an anode input line, a cathode input line and an anode exhaust line, said method comprising:
monitoring the temperature of a cooling fluid flowing through the fuel cell stack;

maintaining the temperature of the cooling fluid at an operating temperature during operation of the fuel cell stack;

purging the anode side of the fuel cell stack at the stack shut-down after the temperature of the cooling fluid is reduced to a predetermined temperature that is cooler than the operating temperature; and switching an output of the fuel cell stack from a primary load to an auxiliary load at the stack shut-down to eliminate remaining hydrogen in the fuel cell stack, wherein the time it takes the auxiliary load to consume the remaining hydrogen is about the same as the time it takes the temperature of the cooling fluid to be reduced from the operating temperature to the predetermined temperature.

* * * * *